Oct. 17, 1944.  B. CHANCE  2,360,330
QUADRANTAL ERROR COMPASS CORRECTOR
Filed Jan. 10, 1940
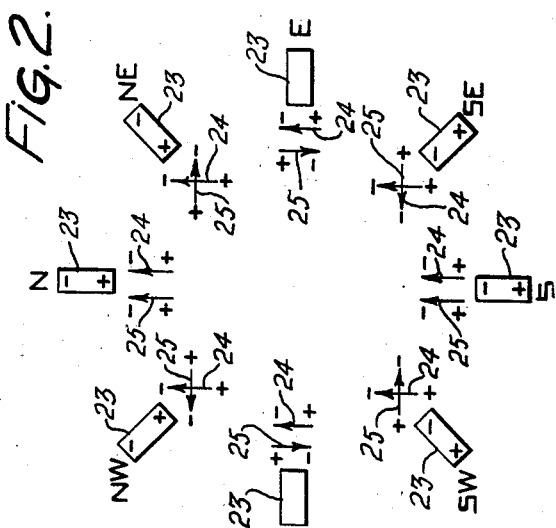
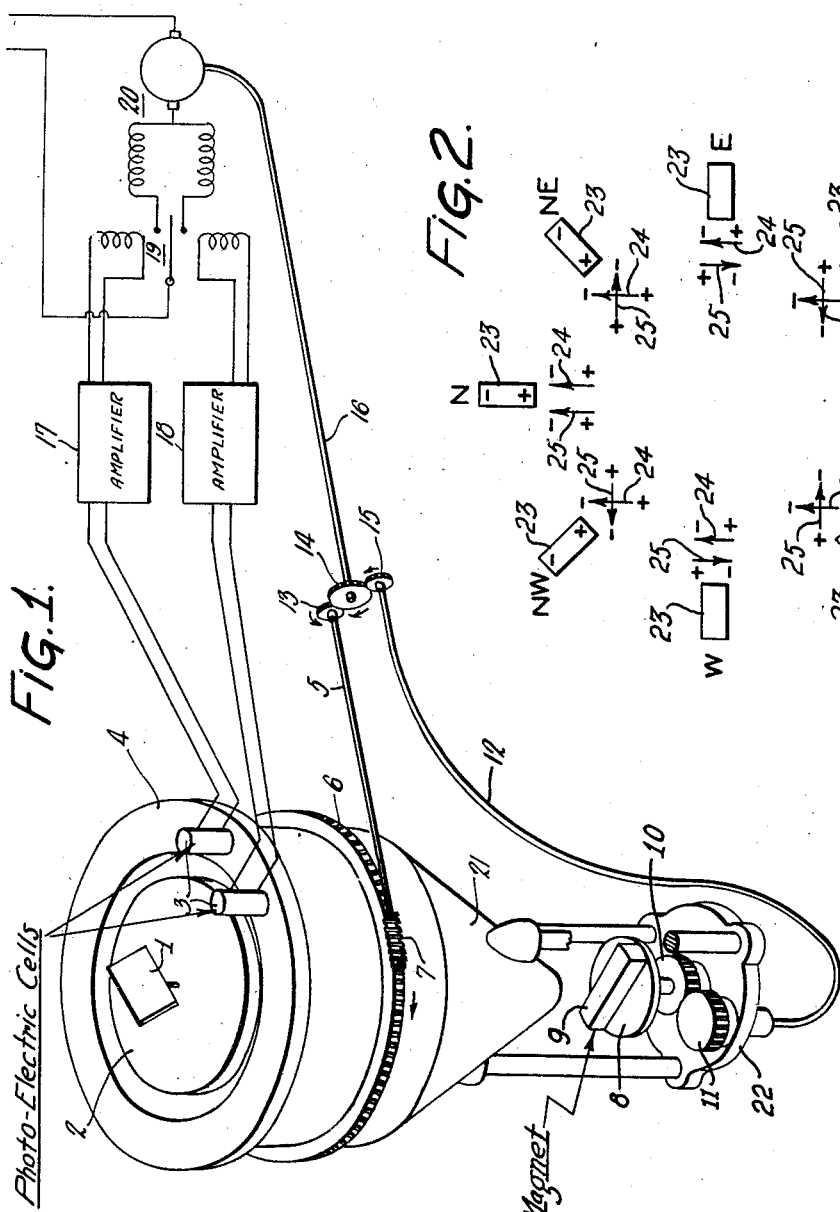
Inventor:
Britton Chance
by his Attorneys
Howson & Howson Patented Oct. 17, 1944

2,360,330

UNITED STATES PATENT OFFICE 2,360,330

QUADRANTAL ERROR COMPASS CORRECTOR

Britton Chance, Mantoloking, N. J.

Application January 10, 1940, Serial No. 313,283
In Great Britain January 11, 1939

3 Claims. (Cl. 33—225)

This invention relates to directional systems employing a magnetic compass, and more particularly to automatic steering systems of this kind employing a beam of radiant energy and devices sensitive thereto, so arranged that a change in the relative disposition of the beam and the devices from a neutral position, brought about by deviation of the ship or other dirigible craft having a rudder under the control of the steering gear, effects starting of a rudder motor to bring the craft back on to its course and also effects operation of follow-up mechanism to restore the beam and the devices to a neutral position and so stop the rudder motor.

In directional systems of this type, a magnetic compass carries means for directing a light beam onto photoelectric cells. A magnetic compass is subject to quadrantal errors which depend upon the nature of the craft on which it is mounted and upon the deviation of the craft from the magnetic meridian. The quadrantal errors have in the past been corrected by the provision of comparatively large masses of soft iron (quadrantal correctors). Although the correction provided by the presence of the iron is reasonably good and is satisfactory for general purposes, it is open to objection in that there is a variable residual magnetism in the iron forming the correcting masses, which residual magnetism itself produces an error.

Again, the influence of each of these iron masses on the compass magnet depends upon the cube of the distance between its centre and the centre of the compass magnet; in iron ships, therefore, and especially in warships, the masses must be very sizable, and even then they must be brought very close to the compass magnet to exert the desired correcting influence on the compass magnet. It is found that when the iron masses are brought close to the compass magnet, the correcting influence exerted will vary with latitude.

Another objection to the use of quadrantal correctors is that the variable residual magnetism in the correctors and their close proximity to the compass magnet places restriction on the design of the compass.

In steering gear of the kind described, the follow-up mechanism provides an element whose position accurately corresponds with that of the compass element, and in accordance with the present invention there is provided means operated by said follow-up mechanism for applying a magnetic correcting force to the said compass element.

In applying the invention for quadrantal correction, for example, it is unnecessary to provide the iron masses as above described, but only a small permanent magnet or one or more groups of such magnets at a reasonable distance from the compass magnet; since magnets are used as correctors, the correcting influence depends upon the square of the distance of the correctors from the compass magnet, and not the cube as before.

Thus, since quadrantal deviation varies as the sine of twice the azimuth, the correction may be obtained by mounting the correcting magnet on a carriage which is geared to the follow-up element in such a way that the carriage turns through twice the azimuth through which the craft's head turns from the north point, in such a sense as to oppose the quadrantal error.

With the foregoing considerations in mind, the general object of the present invention is to provide novel means for correcting the above-mentioned errors.

Reference may now be had to the accompanying drawing wherein Figure 1 is a diagrammatic illustration of an apparatus embodying the features of the invention, and Figure 2 is an explanatory illustration of the underlying principle of the invention.

Referring to the drawing, there is shown diagrammatically a magnetic compass control unit of the type disclosed in my prior Patent No. 2,185,074, granted December 26, 1939. In the illustration, 1 is a reflector mounted on the compass card 2 and adapted to reflect a light beam onto the photo-cells 3 which are mounted on a carriage 4 that is movable relative to the light beam. These elements are mounted in gimbal rings, as shown in the said patent, and the whole unit comprises the binnacle. The carriage 4 is operable by the follow-up shaft 5 through a worm wheel 6 on the carriage and a worm 7 on the shaft. The operation of such a device will be clearly understood from my said patent.

In accordance with the present invention, there is provided, below the compass element 1, and coaxially aligned therewith, a rotatable carriage 8 having mounted thereon at least one suitable correcting magnet 9. The correcting magnet carriage may be mounted on the same gimballing which supports the photo-cell carriage, or it may be mounted on any other suitable support. Thus as illustrated the carriage 8 may be carried by a support 22 suspended from the lower part 21 of the binnacle. The carriage 8 is driven by gears 10 and 11 from a flexible shaft 12. The two shafts 5 and 12 are driven through gars 13, 14 and 15 from the follow-up drive 16.

The photo-cells operate through the usual amplifiers 17 and 18 to actuate the double acting relay 19 which controls the energization of the reversible multi-field motor 20 whose armature shaft drives the follow-up shaft 16. For the purposes of the present invention the motor 20 is a follow-up or servomotor. If the system is utilized for automatic steering, the motor 20 will also actuate the rudder of the craft on which the apparatus is used. However, the present invention is concerned with compass error correction whether or not the system is also used for automatic steering.

The correcting magnet 9 is so oriented that for a given heading of the craft, the magnet will oppose the quadrantal deviation of the compass element, and the magnet is driven by the follow-up in such a manner that it will oppose the quadrantal deviation of said element for all headings of the craft. It is necessary, therefore, that the correcting magnet be so chosen that it will exert the desired influence upon the magnetic element and it is also necessary that the gear ratios be such as to effect the desired rotation. Since the follow-up elements are actuated in proportion to the movement of the craft in azimuth, the correcting magnet is actuated accordingly so that it is always positionally related to the craft's heading.

The principle of operation of the invention may be clearly understood by reference to the explanatory illustration of Fig. 2. In this connection, reference is made to a book entitled "A Practical Manual of the Compass," published by the U. S. Naval Institute at Annapolis, Maryland, which discusses quadrantal error. The illustration of Fig. 2 corresponds generally to the illustration given on page 42 of the said book. Referring to Fig. 2, the craft's induced magnetism is represented by the soft iron bar 23. For different headings of the craft, as illustrated, the polarity of the craft's induced magnetism will be as indicated.

The arrow 24 represents the magnetic compass element, while the arrow 25 represents the correcting magnet provided by the present invention. For purposes of illustration, the head end of each arrow is taken as the negative end, while the opposite end of each arrow is taken as the positive end. As shown in Fig. 1 and as indicated above, the axis of rotation of the correcting magnet is preferably substantially aligned with the axis of rotation of the compass element. However, in Fig. 2 in those positions in which the two elements are aligned, the representative arrows are shown spaced apart for the sake of illustration.

Considering the operation, in position N the quadrantal error is zero and the correcting magnet is aligned with the compass element and exerts no deflecting influence thereon.

In position NE, the craft's heading has rotated clockwise through 45° and the compass element 24 would be deflected clockwise if it were not for the correcting magnet which has now been rotated clockwise through 90°. The influence of the correcting magnet on the compass element opposes the influence of the craft's magnetism. In other words, the correcting magnet exerts a counter-clockwise force upon the compass element in opposition to the clockwise force of the craft's magnetism.

In position E, the quadrantal error is zero and the correcting magnet is aligned with the compass element and exerts no influence thereon, the magnet having been rotated through 180° from the N position.

In position SE, the polarity of the craft's magnetism is as illustrated and tends to rotate the compass element 24 counter-clockwise. The correcting magnet 25, however, has been rotated to the position shown and exerts an opposing force on the compass element.

In position S, the quadrantal error is zero and the correcting magnet is aligned with the compass element, the magnet having been rotated through 360°.

In position SW, the craft's magnetism tends to rotate the compass element clockwise but the correcting magnet exerts an opposing influence, it having been rotated to the position shown.

In position W, the quadrantal error is again zero and since the correcting magnet is aligned with the compass element, it exerts no influence thereon.

In position NW, the craft's induced magnetism tends to rotate the compass element 24 counter-clockwise, but the correcting magnet exerts an opposing influence on the said element.

It will be noted that the correcting magnet is rotated through twice the angle of change of the craft's heading and in a direction to oppose the quadrantal error. This manner of operation is necessary because the quadrantal error varies as the sine of twice the azimuth or angular deviation of the craft's heading.

While a specific embodiment of the invention has been illustrated and described, it will be understood that the invention is not limited thereto but is capable of various modifications within the scope of the appended claims.

I claim:

1. Apparatus for correcting quadrantal error of a magnetic compass on a dirigible craft, comprising at least one correcting magnet rotatably mounted on the craft in the vicinity of the compass, said magnet being positioned relative to the magnetic element of the compass so as to oppose the quadrantal deviation of said element due to the craft's induced magnetism when the craft is headed in a given direction, and means controlled by a direction-responsive element in accordance with changes of the craft's heading for rotating said magnet in a manner to oppose the quadrantal deviation of said compass element for all headings of the craft.

2. An apparatus as defined in claim 1, wherein the said means for rotating the correcting magnet comprises a system including a follow-up drive controlled by relative rotation between the magnetic element of the compass and the craft, and the correcting magnet is driven from the follow-up drive.

3. An apparatus as defined in claim 11, wherein the said means for rotating the correcting magnet comprises a photo-cell system including a follow-up drive controlled by relative rotation between the magnetic element of the compass and the craft, and the correcting magnet is driven from the follow-up drive.

BRITTON CHANCE.